Feb. 3, 1948.   H. T. CASKEY   2,435,382
ADJUSTABLE AUTOMATIC SAW-TABLE GAUGE
Filed April 11, 1945   2 Sheets-Sheet 1
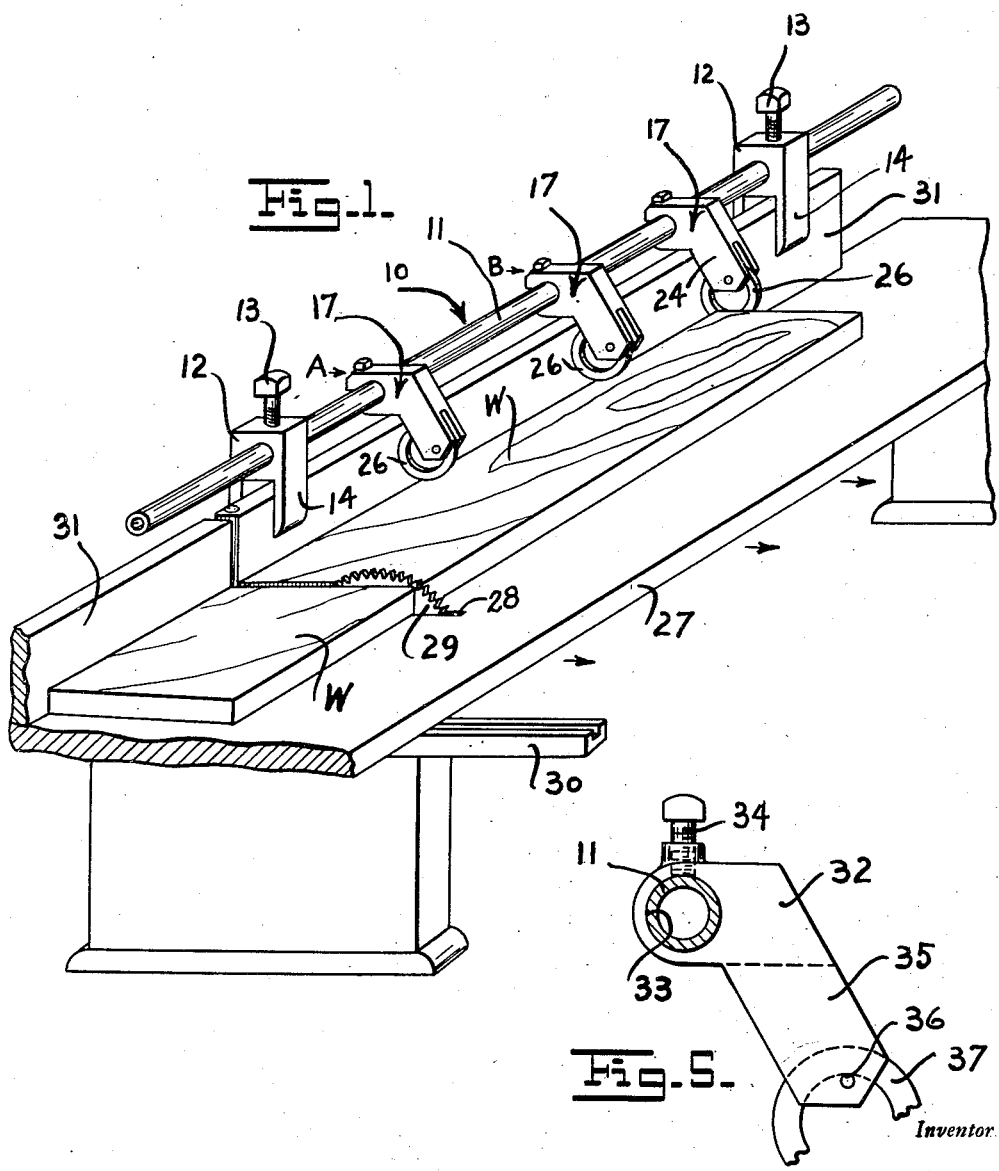
Inventor
HENRY T. CASKEY
By *Clarence A. O'Brien and Harvey B. Jacobson*
Attorneys

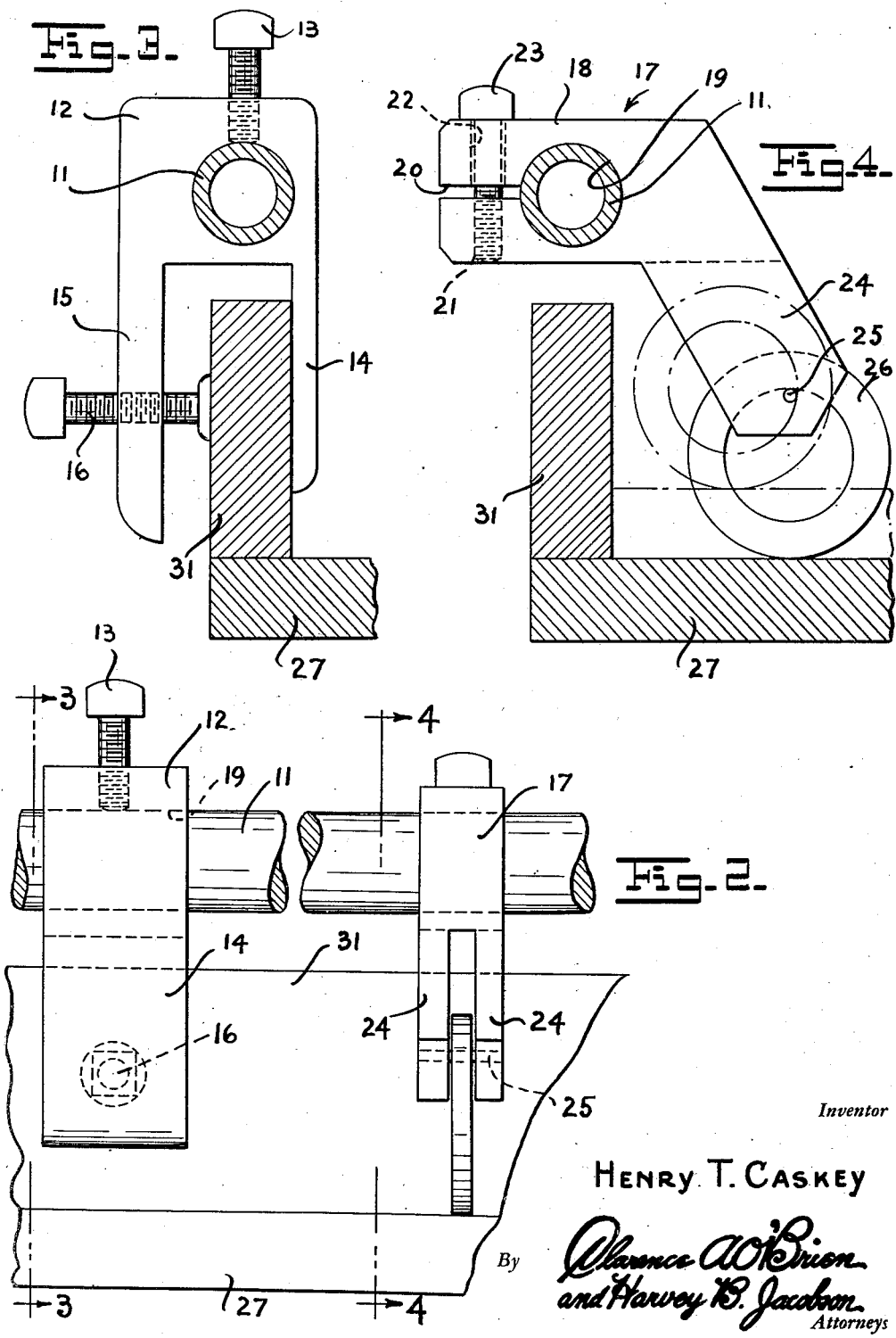

Patented Feb. 3, 1948

2,435,382

UNITED STATES PATENT OFFICE 2,435,382

ADJUSTABLE AUTOMATIC SAW-TABLE GAUGE

Henry T. Caskey, Oakland, Calif.

Application April 11, 1945, Serial No. 587,730

2 Claims. (Cl. 143—174)

This invention relates to a gauge for attachment to woodworking machinery such as saws, dadoes, drills and the like.

The object of the invention is to enable the operator to cut any one of a number of different lengths of material without altering the adjustment of the stops.

The above and other objects may be attained by employing my invention which embodies among its features an attachment carrying a plurality of stops which may be adjusted to various positions along the length of the machine and against which the work to be cut or drilled is arrested when moved longitudinally.

Other features embody stops which normally rest upon the upper surface of the table and which when not serving to arrest the work may be readily lifted out of the way to allow the work to be shoved against an adjacent stop so that its length can be determined with accuracy.

In the drawings—

Figure 1 is a perspective view illustrating my improved gauge attached to a saw table by way of illustration.

Figure 2 is a front view in elevation of a fragment of Figure 1.

Figure 3 is a vertical sectional view taken on the plane of line 3—3 of Figure 2.

Figure 4 is a view similar to Figure 3 taken in the plane of the line 4—4 of Figure 2, and Figure 5 is a view similar to Figure 4 showing a modified form of stop supporting bracket.

In carrying my invention into practice my gauge designated generally 10 comprises a supporting bar 11 to which clamp members 12 are held in adjusted positon by means of set screws 13. These clamp members comprise a substantially inverted U-shaped body from which legs 14 and 15 depend and the leg 15 is pierced with an internally screw-threaded aperture to receive clamping screw 16 (Fig. 3).

Embracing the supporting bar 11 as illustrated in Figure 4 are brackets 17 each of which comprises a body portion 18 having an opening 19 and a slot 20 which communicates with the opening and opens outwardly through the rear end of the body 18 as illustrated in Figure 4. The lower portion of the bracket formed by the slot 20 is internally screw-threaded as at 21 while the upper portion is provided with a smooth bore 22 to receive a clamping screw 23 by means of which the body is clamped to the supporting bar 11. Extending forwardly and downwardly from the forward end of the body 18 is a pair of arms 24 each of which is formed near its forward end with an opening to receive a cross bar 25. Supported on the cross bar for free movement within the space between the legs 24 is a ring-shaped stop 26 which is normally urged in the position shown in full lines in Figure 4 under the influence of gravity.

As illustrated in Figure 1, the gauge 10 is shown attached to a saw frame comprising a table 27 having a slot 28 through which the saw blade 29 projects. As shown this table is adapted to be moved backward and forward toward and away from the saw blade along a track 30 and carries at its rear end a fence 31. While the device is shown as being attached to a saw table it is to be understood that the gauge may be attached to a dadoing machine or drill press by means of which different operations may be performed.

In use, as illustrated in Figure 1, the members 12 are clamped by clamping screw 16 (Figure 3) to the fence 31 and the gauge members 17 are adjusted to the desired positions along the bar 11 in order to determine the length of cut to be made. The saw table is next moved forwardly in the direction of the arrows in Figure 1 after which the work W is placed upon the table and moved longitudinally so as engage a stop 26 at A. The saw cut may then be made and a piece will result which is of a length equal to the distance between the saw 29 and first stop A. Should it be desired to cut a longer length, the work is placed on the table with its ends between the stops A and B and upon moving the work back against the fence, the stop at A is automatically lifted so as to permit the work to be moved into contact with the stop at B. When in this position the stop ring 26 at A will rest upon the upper surface of the work as shown in Figure 1. The saw cut is then made and the result is a piece equal to the distance between the saw 29 and the stop B. It will thus be seen that pieces of varying lengths may be readily produced without requiring readjustment of the positions of the stops and desired lengths may be easily and quickly duplicated as often as required. While only three stops have been shown it is to be understood that any number of stops may be employed and where desired the work W may be advanced longitudinally of the table to pass as many stops as it is desired to omit. It is obvious that the same gauge may be employed on dadoing machines or upon drill presses and that by utilizing the stops in the manner described accurate cuts may be made or accurate spacing of holes in a single piece may be obtained with a minimum of effort.

In Figure 5, I have illustrated a modified form of clamp for the stops each of which comprises a body portion 32 which is pierced as at 33 to receive the supporting bar 11. In this type of device I employ a set screw 34 for holding the stop in the desired position on the bar 11. Like the stop previously described the body is provided with depending arms 35 which are connected at their lower ends by a cross pin 36 upon which the stop rings 37 are suspended in the same manner as the rings 26. Such stops as those disclosed in Figure 5 can be substituted for those disclosed in Figure 4 though the former type described is preferred.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A gauge attachment for woodworking machine comprising a supporting bar, supporting clamps adjustably attached to the bar near opposite ends and adapted to be clamped to the fence of a woodworking machine, stops adjustable on the supporting bar between the clamps, forwardly and downwardly extending arms at the forward ends of the stops, each of said arms being bifurcated adjacent its forward end, and stop rings suspended in the bifurcations in said arms and adapted to fall by gravity behind the end of the work and serve as abutments against which the work is pressed during an operation thereon.

2. The combination with a saw having a movable table and a fence, of a gauge comprising a supporting bar, means to clamp the supporting bar to the fence, stops carried by the supporting bar and overhanging the table, each stop bifurcated at its overhanging end and stop rings suspended in the bifurcated ends of the stops and adapted to rest upon the table when no work is supported on the table beneath the overhanging ends of the stops.

HENRY T. CASKEY.

REFERENCES CITED

The following references are of record in the file of this patent:

UNITED STATES PATENTS

| Number | Name | Date |
|---|---|---|
| 305,563 | Baer | Sept. 23, 1884 |
| 836,237 | Bonte | Nov. 20, 1906 |
| 1,017,632 | Williams | Feb. 13, 1912 |
| 1,504,248 | Johnson | Aug. 12, 1924 |
| 1,566,225 | Mills | Dec. 15, 1925 |
| 1,823,268 | Gordon | Sept. 15, 1931 |